(12) United States Patent
Xie et al.

(10) Patent No.: US 12,259,807 B2
(45) Date of Patent: Mar. 25, 2025

(54) METHOD AND SYSTEM FOR MANAGING LIFE CYCLE ITERATION OF TEST CASE, AND MEDIUM

(71) Applicant: NIO TECHNOLOGY (ANHUI) CO., LTD, Hefei (CN)

(72) Inventors: Yan Xie, Shanghai (CN); Fangli Sun, Shanghai (CN); Dongxu Zhao, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 185 days.

(21) Appl. No.: 17/882,769

(22) Filed: Aug. 8, 2022

(65) Prior Publication Data

US 2023/0053698 A1 Feb. 23, 2023

(30) Foreign Application Priority Data

Aug. 19, 2021 (CN) .......................... 202110953712.5

(51) Int. Cl.
*G06F 11/36* (2006.01)
*G06F 11/3668* (2025.01)

(52) U.S. Cl.
CPC ........ *G06F 11/3684* (2013.01); *G06F 11/368* (2013.01)

(58) Field of Classification Search
CPC ............................ G06F 11/3684; G06F 11/368
USPC .......................................................... 717/124
See application file for complete search history.

(56) References Cited

U.S. PATENT DOCUMENTS

| | | | | |
|---|---|---|---|---|
| 8,347,147 B2 * | 1/2013 | Adiyapatham | ..... | G06F 11/3672 717/124 |
| 8,949,670 B1 | 2/2015 | Vemuri et al. | | |
| 9,710,367 B1 | 7/2017 | Nagineni | | |
| 10,073,763 B1 * | 9/2018 | Raman | ................ | G06F 11/3688 |
| 10,642,721 B2 * | 5/2020 | Kulkarni | ............. | G06F 11/3688 |
| 10,776,251 B1 * | 9/2020 | Elgarat | ............... | G06F 11/3684 |
| 2016/0246706 A1 * | 8/2016 | Sathyamurthy | ..... | G06F 11/3664 |
| 2019/0196950 A1 * | 6/2019 | Ranganathan | ...... | G06F 11/3676 |
| 2019/0324894 A1 * | 10/2019 | Liu | ..................... | G06F 16/9027 |
| 2020/0151089 A1 * | 5/2020 | Bakshi | ................ | G06F 11/3696 |
| 2021/0326247 A1 * | 10/2021 | Mohankumar | ... | G06F 18/24323 |

FOREIGN PATENT DOCUMENTS

| | | | | |
|---|---|---|---|---|
| CN | 109062819 A | * | 12/2018 | .......... G06F 11/3684 |
| CN | 109800147 A | * | 5/2019 | |
| CN | 110046087 A | * | 7/2019 | ....... G01R 31/31835 |

(Continued)

OTHER PUBLICATIONS

Text English Translation for Foreign Patent Documents.*

(Continued)

*Primary Examiner* — Francisco J Aponte
(74) *Attorney, Agent, or Firm* — Sheridan Ross P.C.

(57) ABSTRACT

The disclosure provides a method and system for managing a life cycle iteration of a test case, where the method includes the following steps: writing a test case according to a mind map template; importing the written test case in batches based on the mind map template; storing the imported test case, and marking the test case, where the marking includes marking the test case as a manual test case; and creating an automated test case, and associating the automated test case with the manual test case.

18 Claims, 3 Drawing Sheets

(56) References Cited

FOREIGN PATENT DOCUMENTS

| CN | 110209578 | A | * | 9/2019 | .......... G06F 11/3684 |
|----|-----------|---|---|--------|-------------------------|
| CN | 110687376 | A | * | 1/2020 | |
| CN | 111104317 | | | 5/2020 | |
| CN | 111221740 | A | * | 6/2020 | |
| CN | 112579454 | A | * | 3/2021 | .......... G06F 11/3684 |
| CN | 112860581 | | | 5/2021 | |
| CN | 113495827 | A | * | 10/2021 | |
| CN | 113641590 | A | * | 11/2021 | |
| CN | 115080444 | A | * | 9/2022 | |
| CN | 115391220 | A | * | 11/2022 | |

OTHER PUBLICATIONS

I. Otaduy et al. "User acceptance testing for Agile-developed web-based applications: Empowering customers through wikis and mind maps"; The Journal of Systems and Software; ONEKIN Research Group, University of the Basque Country (UPV/EHU), P. Manuel Lardizabal 1, San Sebastián, Spain—133 (2017) 212-229.*
Extended Search Report for European Patent Application No. 22165796.8, dated Sep. 23, 2022, 9 pages.

* cited by examiner

1000

2000

3000

4000

METHOD AND SYSTEM FOR MANAGING LIFE CYCLE ITERATION OF TEST CASE, AND MEDIUM

CROSS-REFERENCE TO RELATED APPLICATION

This application claims the benefit of China Patent Application No. 202110953712.5 filed Aug. 19, 2021, the entire contents of which are incorporated herein by reference in its entirety.

TECHNICAL FIELD

The disclosure relates to the technical field of software testing, and in particular, to a method and system for managing a life cycle iteration of a test case, and an associated computer-readable storage medium.

BACKGROUND ART

At present, there are a large number of software business services in an enterprise, and the software businesses iterate rapidly. Conventional test case management systems require manual input of test cases, which is time-consuming either in writing or inputting, and has difficulty in meeting time-effectiveness of rapid iterations. In order to adapt to rapid iteration pace, writing cases with document-based means is more popular, for example, using Excel, X-mind, and other software to write test cases. However, it is difficult to manage iterations of test cases in business scenarios while simplifying creation of test cases. Software testing often faces problems such as a lack of management of test cases and loss of test cases caused by scattered storage management of test cases. When the business scenario is unchanged and a system architecture is revised, there is a need to organize and write regression test cases again, which may even lead to omissions, and then may lead to online accidents caused by omissions.

SUMMARY OF THE DISCLOSURE

Therefore, for test case management, the disclosure proposes a method and system for managing a life cycle iteration of a test case, and a medium, to better assist in tacking management and iteration of test cases.

According to an aspect of the disclosure, a method for managing a life cycle iteration of a test case is provided, where the method includes the following steps: writing a test case according to a mind map template; importing the written test case in batches based on the mind map template; storing the imported test case, and marking the test case, where the marking includes marking the test case as a manual test case; and creating an automated test case, and associating the automated test case with the manual test case.

Further, according to one or more embodiments of an aspect of the disclosure, the method further includes adding the manual test case associated with the automated test case.

Further, according to one or more embodiments of an aspect of the disclosure, the method further includes discarding the manual test case associated with the automated test case.

Further, according to one or more embodiments of an aspect of the disclosure, the method further includes updating an association between the automated test case and the manual test case by adding or discarding the manual test case associated with the automated test case.

Further, according to one or more embodiments of an aspect of the disclosure, the association is to use a number of the automated test case as a prefix of a number of the associated manual test case.

Further, according to one or more embodiments of an aspect of the disclosure, the method further includes marking the test case as an automated test case or a manual test case by marking the test case with an "automated" tag or a "manual" tag.

Further, according to one or more embodiments of an aspect of the disclosure, the method further includes marking the test case as a customized test case by marking the test case with a customized tag.

Further, according to one or more embodiments of an aspect of the disclosure, the customized tag includes one or more of the following tags: an "automated" tag, a "manual" tag, an "API" tag, a "Web" tag, an "iOS" tag, an "Android" tag, an "implemented" tag, and a "not implemented" tag.

Further, according to one or more embodiments of an aspect of the disclosure, the method further includes checking a tag and an association of the test case.

Further, according to one or more embodiments of an aspect of the disclosure, the method further includes reporting the tag and the association of the imported test case by means of a push message.

Further, according to one or more embodiments of an aspect of the disclosure, the method further includes collecting statistics about one or more of the following data: the number, tag, type of distribution, and association of the imported test case.

According to another aspect of the disclosure, a system for managing a life cycle iteration of a test case is provided, where the system includes: a mind map module configured to provide a mind map template to write a test case; a test case analysis module configured to import the written test case in batches based on the mind map template; and a test case management module configured to store the imported test case, and mark the test case, where the marking includes marking the test case as a manual test case, and the test case management module is further configured to create an automated test case, and associate the automated test case with the manual test case.

Further, according to one or more embodiments of another aspect of the disclosure, the test case management module is configured to add the manual test case associated with the automated test case.

Further, according to one or more embodiments of another aspect of the disclosure, the test case management module is configured to discard the manual test case associated with the automated test case.

Further, according to one or more embodiments of another aspect of the disclosure, the test case management module is configured to update an association between the automated test case and the manual test case by adding or discarding the manual test case associated with the automated test case.

Further, according to one or more embodiments of another aspect of the disclosure, the association is to use a number of the automated test case as a prefix of a number of the associated manual test case.

Further, according to one or more embodiments of another aspect of the disclosure, the test case management module is configured to mark the test case as an automated test case or a manual test case by marking the test case with an "automated" tag or a "manual" tag.

Further, according to one or more embodiments of another aspect of the disclosure, the test case management module is configured to mark the test case as a customized test case by marking the test case with a customized tag.

Further, according to one or more embodiments of another aspect of the disclosure, the customized tag includes one or more of the following tags: an "automated" tag, a "manual" tag, an "API" tag, a "Web" tag, an "iOS" tag, an "Android" tag, an "implemented" tag, and a "not implemented" tag.

Further, according to one or more embodiments of another aspect of the disclosure, the test case analysis module is configured to check a tag and an association of the test case.

Further, according to one or more embodiments of another aspect of the disclosure, the test case analysis module is configured to report the tag and the association of the imported test case by means of a push message.

Further, according to one or more embodiments of another aspect of the disclosure, the test case analysis module is configured to collect statistics about one or more of the following data: the number, tag, type of distribution, and association of the imported test case.

The disclosure further provides a computer-readable storage medium storing instructions, and the instructions, when executed by a processor, cause the processor to perform the foregoing methods.

Compared with the prior art, the method and system provided in the disclosure may edit and store a plurality of test cases in batches, and use an automated test case to dynamically manage the plurality of test cases. In addition, the disclosure may be customized to display test cases and information related to the test cases, such as the number of manual test cases, the number of automated test cases, proportional distribution, distribution of module cases, distribution of front-end cases, and distribution of interface cases, and may display information related to the test cases such as "name, business line, and description", so that a user can have an overall understanding of a situation of a project from a case level.

DETAILED DESCRIPTION OF EMBODIMENTS

Figure 1:
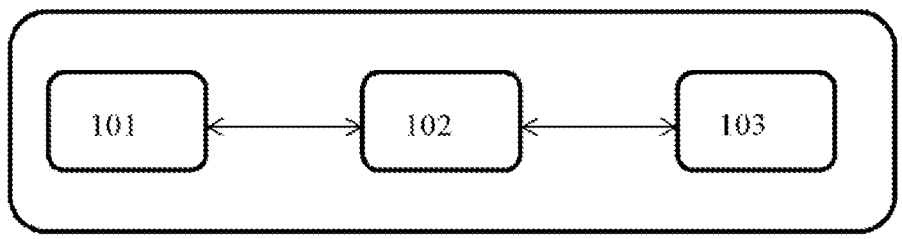
FIG. 1 is a block diagram of a system 1000 for a life cycle iteration of a test case according to an embodiment of the disclosure.

A detailed description of a method and system for managing a life cycle iteration of a test case in the disclosure will be described below in conjunction with the accompanying drawings. It should be noted that the following detailed description of embodiments are exemplary rather than limiting, and are intended to provide a basic understanding of the disclosure, and are not intended to confirm key or decisive elements of the disclosure or limit the scope of protection.

The disclosure is described below with reference to block diagram descriptions, block diagrams and/or flowcharts of the methods and apparatuses in the embodiments of the disclosure. It should be understood that these flowchart descriptions and/or each block in the block diagram, and combinations of the flowchart descriptions and/or the block diagram, can be implemented by computer program instructions. These computer program instructions may be provided to a processor of a general-purpose computer, a dedicated computer, or other programmable data processing devices to constitute a machine, so that the instructions executed by the processor of the computer or the other programmable data processing devices create components for implementing the functions/operations specified in these flowcharts and/or blocks and/or one or more flow block diagrams.

These computer program instructions may be stored in a computer-readable memory that can instruct a computer or another programmable processor to implement the functions in a specific manner, so that the instructions stored in the computer-readable memory generate a manufactured product containing instruction components that implement the functions/operations specified in one or more blocks of the flowchart and/or the block diagram.

These computer program instructions may be loaded onto the computer or the another programmable data processor, so that a series of operations and steps are performed on the computer or the another programmable processor, to form a computer-implemented process. As such, the instructions executed on the computer or the another programmable data processor provide steps for implementing the functions or operations specified in one or more blocks in the flowchart and/or block diagram. It should also be noted that in some alternative implementations, the functions/operations shown in the blocks may not occur in the order shown in the flowchart. For example, two blocks shown in sequence may actually be executed substantially simultaneously or the blocks may sometimes be executed in a reverse order, depending on the functions/operations involved.

The disclosure provides a method and system for managing a life cycle iteration of a test case, which can perform comprehensive management and analysis on a test case during a life cycle of the test case by combining a mind map module, a test case analysis module, and a test case management module, so as to prevent problems encountered in management of test cases in the prior art. In particular, the mind map module may be software or a system commonly used in the art for producing mind maps, UML diagrams, architecture diagrams, topological diagrams, flowcharts, business flowcharts, and thinking maps, such as GetMind and MindMaster. The test case analysis module may be software or a system commonly used in the art of data analysis, such as Excel and SPSS, or may be a dedicated data analysis code written in R, Python, or other languages. The test case management module can be software and associated plug-ins commonly used in the art for test cases, project management, and process management, such as Jira Xray. The method and system for managing a life cycle iteration of a test case provided in the disclosure can implement operations such as test case checking, automated case and manual test case management, and association. Moreover, based on the above operations, management of iterations of the test cases can be implemented, so that a user can implement a better connection and organization of test cases at every step of using and writing the test cases. It should be noted that in the context of the disclosure, association may refer to both an action of associating feature A with feature B and an association relationship or a correlation relationship created by an associating action.

The method and system for managing a life cycle iteration of a test case provided in the disclosure use the mind map module as a mind map template to rapidly write test cases during an iteration period of the test cases. Editing test cases in the form of the mind map template can quickly implement interactive checking with business/product/development. The test case analysis module can import a plurality of test cases written by the mind map module to the test case management module (e.g., Jira Xray) for management and analysis. The test cases imported to the test case management module are set as manual test cases by default, and the user can use the test case management module to create automated test cases, and the automated test cases can be associated with the manual test cases. The associated manual test cases can be added or discarded to update and iterate the manual cases. The automated test cases can be associated with the manual test cases using Link, in particular, by using numbers of the automated test cases as prefixes of numbers of the manual test cases. In addition, other customized tags can also be used to mark test cases in a test case management system for management of and statistics collection about various types of data, including: types of the test cases, coverage rates of the test cases, the number of manual test cases, the number of automated test cases, proportional distribution of the test cases, distribution of the test cases, distribution of front-end test cases, distribution of interface cases of the test cases, and the like. The method and system can also display information related to the test cases such as "name, business line, description, and association relationship" to statistically analyze the test cases in a plurality of dimensions.

The test cases in the disclosure may be any test case type commonly used in the art, including, for example, test case titles, test case conditions, operation steps, and expected results. A plurality of titles, conditions, steps, and results may be included in a single test case.

FIG. 1 is a block diagram of a system 1000 for a life cycle iteration of a test case according to an embodiment of the disclosure. As shown in FIG. 1, the system 1000 for a life cycle iteration of a test case includes three modules, which are specifically: a mind map module 101 configured to provide a mind map template to write a test case; a test case analysis module 102 configured to import the written test case in batches to a test case management module based on the mind map template; and a test case management module 103 configured to store the imported test case, and mark the test case, where the marking includes marking the test case as a manual test case, and the test case management module 103 is further configured to create an automated test case, and associate the automated test case with the manual test case. As shown in FIG. 1, the user can edit the mind map module 101 to edit the test case in the form of a mind map. In particular, the user can edit a plurality of test cases in the form of a mind map. The test cases edited in this manner may have a hierarchical or parallel relationship depending on project requirements, thus reflecting a relationship between the project requirements and the test cases. The user may send the edited test cases (in the form of a mind map) to the test case analysis module 102. The test case analysis module 102 may import the plurality of test cases to the test case management module 103 (e.g., Jira Xray). After being imported to the test case management module 103, the plurality of test cases associated with the mind map will be stored as parallel scattered test cases for processing by the test case management module 103. In this manner, the plurality of test cases can be imported in batches.

The test cases imported in this manner will be marked as the manual test cases by default in the test case management module 103. The user can also directly add the test cases to the test case management module 103 one by one and add customized test case tags. The test case tags may include one or more of the following tags: an "automated" tag, a "manual" tag, an "API" tag, a "Web" tag, an "iOS" tag, an "Android" tag, an "implemented" tag, a "not implemented" tag, and any other tag that may actually be required to be used for marking and classifying in the project. After being added with the tag, the user can classify the test cases on the test case management module 103, for example, marking a manually created test case as an automated test case with an "automated" tag or marking the test case as an "iOS" test case. The user may also associate tagged test cases, for example, associate the automated test case with a previously imported manual test case, thus creating a test case relationship network of test cases with a proportion 1: N. Specifically, one automated test case can be associated with N (N is a natural number greater than 0) manual test cases, while one manual test case can be associated with only one automated test case. The association can be implemented by editing a number of the automated test case in the test case management module 103 (e.g., Jira business number) as prefixes of the manual test cases. The association can also be implemented by other means commonly used in the art. After associating the automated test case with the manual test case, the test case analysis module 102 can extract the relationship between the test cases and display the relationship visually to the user, so that the user can observe the relationship between the test cases in the project. The test case analysis module 102 can also synchronize other tags added by the user to the test case management module 103 and extract the tags on which the test cases have been tagged, thereby dynamically displaying to the user types of the test cases, coverage rates of the test cases, the number of manual test cases, the number of automated test cases, proportional distribution of the test cases, distribution of the test cases, distribution of front-end test cases, and distribution of interface cases of the test cases in the project. The test case analysis module can also display information related to the test cases such as "name, business line, description, and association relationship" to statistically analyze the test cases in a plurality of dimensions.

Figure 2:
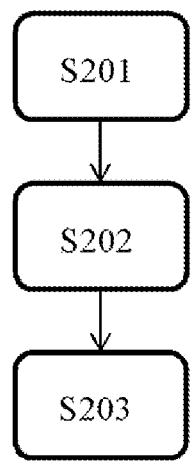
FIG. 2 is a flowchart of a method 2000 for a life cycle iteration of a test case according to an embodiment of the disclosure.

As described above, by tagging and associating the test cases in the test case management module 103, the user can iteratively update the relationship between the automated test cases and the manual test cases. FIG. 2 is a flowchart of a method 2000 for a life cycle iteration of a test case according to an embodiment of the disclosure. As shown in FIG. 2, at step S201, a user can create a new automated test case in a test case management module and associate the automated test case with two manual test cases, for example, a manual test case 1 and a manual test case 2. At step S202, the user can add a new associated manual test case, for example, by re-associating the automated test case with a new manual test case 3, thereby adding a new associated manual test case. At step S203, the user can update the manual test case 2 and the manual test case 3 associated with the automated test case to other manual test cases, for example, a manual test case 4 and a manual test case 5. Similarly, the user can also discard the associated manual test cases, for example, discard the manual test case 4.

Finally, by updates and iterations, the automated test case is associated with the manual test case 1 and the manual test case 5. The above operations and relationships can be visually displayed to the user through the test case analysis module, so that the user can observe changes in the test cases, and therefore, dynamically adjust the test cases according to the project requirements, thereby avoiding problems encountered during management of test cases in the prior art.

Through the above operations, the user can add test cases, classify test case tags, marking cases manually/in an automated manner, associate test cases, update test cases, iterate test cases, and discard test cases through the system and method of the disclosure. Based on the above operations, the user can periodically check anomalous test case data in the test case management module, eliminate dirty data that does not conform to management of the association relationships, supplement test case data, and correct error relationships or data in the test cases through the test case analysis module.

The mind map module can provide the user with a way to create test cases in batches during an integrated testing period so that a plurality of associated test cases can be created in batches for a project. A mind map template can be generated by customized development according to actual needs.

As described above, the user can import the test cases to the test case management module through the test case analysis module, thereby generating a plurality of manual test cases in the test case management module. These test cases can also be customized and defined as different types of test cases, such as "API" cases, "web" cases, "iOS" cases, "Android" cases, and the like, and associated with each other. A means of tag association provides self-service combination updates, which ensures that the user have a good and fast creation experience while simultaneously and quickly implementing storage and classification of cases.

As described above, when creating the automated test case, the user may set the "automated" tag for the test case management module, and associate the automated test case with 1 to N manual test cases, thereby creating a relationship network of the automated cases and the manual cases. In addition, a test case number of the automated test case is used as a prefix of a manual test case number. The system provided in the disclosure supports periodically checking whether prefixes of numbers of the automated test cases are consistent with the associated manual use case data, and if there are differences, the system can use push messages to prompt the user to update the relationships. The system can also periodically synchronize the information about all test cases in the test case management system and the associated relationships, and can set an appropriate synchronization and update mechanism based on an estimated case data amount level. Moreover, the user can also update the automated test cases. Updated data is synchronized to the system with timed tasks. By updating and discarding unorganized cases and a form of a directory they belong to, the system uses periodic push messages to prompt the user to complete the sorting and filing work in time.

Figure 3:
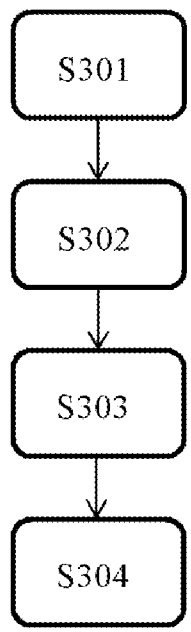
FIG. 3 is a flowchart of a method 3000 for a life cycle iteration of a test case according to an embodiment of the disclosure.

FIG. 3 is a flowchart of a method 3000 for a life cycle iteration of a test case according to an embodiment of the disclosure. As shown in FIG. 3, the method 3000 for managing a life cycle iteration of a test case includes the following steps: step S301, writing a test case according to a mind map template; step S302, importing the written test case in batches based on the mind map template; step S303, storing the imported test case, and marking the test case, where the marking includes marking the test case as a manual test case; and step S304, creating an automated test case, and associating the automated test case with the manual test case.

In the method 3000, the automated test case can be associated with a plurality of manual test cases with a proportion 1: N (N is a natural number greater than 0). The user can update the manual test cases associated with the automated test case, for example, add the manual test cases associated with the automated test case or discard the manual test cases associated with the automated test case. An association between the automated test case and the manual test cases is updated by adding or discarding the manual test cases associated with the automated test case. In the method 3000, the association is to use a number of the automated test case as prefixes of numbers of the associated manual test cases. The user marks the test case as an automated test case or a manual test case by marking the test case with an "automated" tag or a "manual" tag. In the method 3000, the user may further mark the test case as a customized test case by marking the test case with a customized tag. The customized tags includes one or more of the following tags: an "automated" tag, a "manual" tag, an "API" tag, a "Web" tag, an "iOS" tag, an "Android" tag, an "implemented" tag, and a "not implemented" tag. The method 3000 may further include checking a tag and an association of the test case, and reporting the tag and the association of the imported test case by means of a push message. In addition, the method 3000 may further include collecting statistics about one or more of the following data: the number, tag, type of distribution, and association of the imported test case.

Figure 4:
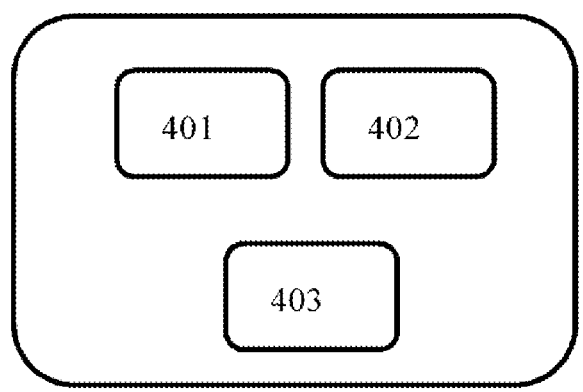
FIG. 4 is a block diagram of a system 4000 for a life cycle iteration of a test case according to an embodiment of the disclosure.

FIG. 4 is a block diagram of a system 4000 for a life cycle iteration of a test case according to an embodiment of the disclosure. As shown in FIG. 4, the system 4000 for managing a life cycle iteration of a test case includes: a mind map module 401 configured to provide a mind map template for the user to write a test case; a test case analysis module 402 configured to import the written test case in batches based on the mind map template; and a test case management module 403 storing the imported test case, and marking the test case, where the marking includes marking the test case as a manual test case, and the test case management module 403 is further configured to create an automated test case, and associate the automated test case with the manual test case.

In the system 4000, the automated test case can be associated with a plurality of manual test cases with a proportion 1: N (N is a natural number greater than 0). The user can update the manual test cases associated with the automated test case, for example, add the manual test cases associated with the automated test case or discard the manual test cases associated with the automated test case. An association between the automated test case and the manual test cases is updated by adding or discarding the manual test cases associated with the automated test case. In the system 4000, the association is to use a number of the automated test case as prefixes of numbers of the associated manual test cases. The user marks the test case as an automated test case or a manual test case by marking the test case with an "automated" tag or a "manual" tag. In the system 4000, the user may further mark the test case as a customized test case by marking the test case with a customized tag. The customized tags includes one or more of the following tags: an "automated" tag, a "manual" tag, an "API" tag, a "Web" tag, an "iOS" tag, an "Android" tag, an "implemented" tag, and a "not implemented" tag. The system 4000 may further check a tag and an association of the test case, and report the tag and the association of the imported test case by means of a push message. In addition, the system 4000 may further collect statistics about one or more of the following data: the number, tag, type of distribution, and association of the imported test case.

Figure 5:
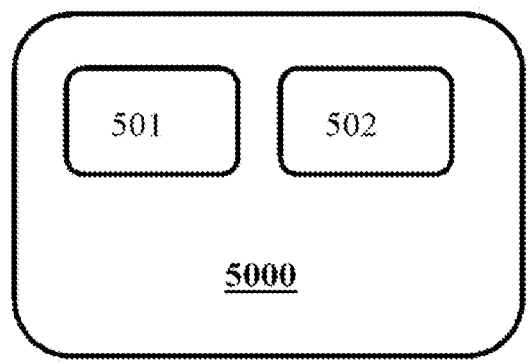
FIG. 5 shows a computer device for a method for a life cycle iteration of a test case according to an embodiment of the disclosure.

FIG. 5 shows a computer device for a method for a life cycle iteration of a test case according to an embodiment of the disclosure. As shown in FIG. 5, a computer device 5000 includes a memory 501 and a processor 502. Although not shown, the computer device 500 further includes a computer program stored on the memory 501 and capable of running on the processor 502. When the program is executed by the processor, the steps shown in FIGS. 1 and 3 are implemented.

In addition, as described above, the disclosure may also be implemented as a readable storage medium in which a program is stored for causing a computer to perform the method for a life cycle iteration of a test case as described above.

Here, various readable storage media, such as disks (e.g., a magnetic disk, an optical disc, etc.), cards (e.g., a memory card, an optical card, etc.), semiconductor memories (e.g., a ROM, a non-volatile memory, etc.), and tapes (e.g., a magnetic tape, a cassette tape, etc.), can be used as the storage medium.

By recording, in these readable storage media, a computer program that enables a computer to perform the method for a life cycle iteration of a test case in the embodiments described above or a computer program that enables a computer to implement functions of the method for a life cycle iteration of a test case in the embodiments described above and circulating the computer program, costs may be reduced and portability and versatility may be improved.

In addition, the readable storage medium described above is loaded on the computer, the computer reads the computer program recorded in the storage medium and stores same in a memory, and a processor (central processing unit (CPU) and a micro processing unit (MPU)) provided on the computer reads out and executes the computer program from the memory, whereby the method for a life cycle iteration of a test case in the embodiments described above can be performed, and functions of the apparatus for implementing the method for a life cycle iteration of a test case in the embodiments described above can be implemented.

Those of ordinary skill in the art should understand that the disclosure is not limited to the embodiments above, and the disclosure can be implemented in many other forms without departing from the essence and scope thereof. Therefore, the presented examples and embodiments are regarded as schematic rather than restrictive, and without departing from the spirit and scope of the disclosure that are defined by the appended claims, the disclosure may cover various changes and replacements.

The invention claimed is:

1. A method for managing a life cycle iteration of a test case, the method comprising:
    writing test cases using a mind map template;
    importing the mind map template, with the test cases, in batches;
    storing the test cases based on the importing, and marking, by default, each test case as a manual test case to form a plurality of manual test cases; and
    creating an automated test case, and associating the automated test case with a first manual test case of the plurality of manual test cases by assigning a number of the automated test case as a prefix of a number of the first manual test case.

2. The method according to claim 1, further comprising adding a second manual test case to the automated test case.

3. The method according to claim 1, further comprising removing the first manual test case from the automated test case.

4. The method according to claim 2, further comprising updating an association between the automated test case and the second manual test case by adding or removing the second manual test case from the automated test case.

5. The method according to claim 4, further comprising displaying the updated association to a user.

6. The method according to claim 5, further comprising marking the test case as an automated test case or a manual test case with an "automated" tag or a "manual" tag.

7. The method according to claim 5, further comprising marking the test case as a customized test case with a customized tag.

8. The method according to claim 7, wherein the customized tag comprises one or more of the following tags: an "automated" tag, a "manual" tag, an "API" tag, a "Web" tag, an "iOS" tag, an "Android" tag, an "implemented" tag, and a "not implemented" tag.

9. The method according to claim 8, further comprising checking a tag and an association of the test case.

10. The method according to claim 9, further comprising reporting the tag and the association of the test case by means of a push message.

11. The method according to claim 9, further comprising collecting statistics about one or more of the following data: the number, tag, type of distribution, and association of the test case.

12. The method according to claim 3, wherein the method further comprises updating an association between the automated test case and a second manual test case by adding or removing the second manual test case from the automated test case.

13. The method according to claim 2, wherein the second manual test case is associated with the automated test case by assigning the number of the automated test case as a prefix of a number of the second manual test case.

14. A system for managing a life cycle iteration of a test case, comprising:
    a processor-implemented mind map module configured to provide a mind map template to write test cases;
    a processor-implemented test case analysis module configured to import the mind map template, with the test cases, in batches; and
    a processor-implemented test case management module configured to:
        store the test cases based on the importing, and to mark, by default, each test case as a manual test case to form a plurality of manual test cases;
        create an automated test case, and associate the automated test case with a first manual test case of the plurality of manual test cases by assigning a number of the automated test case as a prefix of a number of the first manual test case.

15. The system according to claim 14, wherein the processor-implemented test case management module is configured to add a second manual test case to the automated test case.

16. The system according to claim 14, wherein the processor-implemented test case management module is configured to remove the first manual test case from the automated test case.

17. The system according to claim 15, wherein the second manual test case is associated with the automated test case by assigning the number of the automated test case as a prefix of a number of the second manual test case.

18. A non-transitory computer-readable storage medium storing instructions, wherein the instructions, when executed by a processor, cause the processor to perform a method for managing a life cycle iteration of a test case, the method comprising:
- writing test cases using a mind map template;
- importing the mind map template, with the test cases, in batches;
- storing the test cases based on the importing, and marking, by default, each test case as a manual test case to form a plurality of manual test cases; and
- creating an automated test case, and associating the automated test case with a first manual test case of the plurality of manual test cases by assigning a number of the automated test case as a prefix of a number of the first manual test case.

* * * * *